United States Patent [19]
Overbergh et al.

[11] Patent Number: 4,824,706
[45] Date of Patent: Apr. 25, 1989

[54] WRAP-AROUND RECOVERABLE ARTICLE

[75] Inventors: Noel M. M. Overbergh, Bertem; Bert Decneut, Linden, both of Belgium

[73] Assignee: Raychem Corporation, Menlo Park, Calif.

[21] Appl. No.: 92,831

[22] Filed: Sep. 3, 1987

[30] Foreign Application Priority Data

Oct. 20, 1986 [GB] United Kingdom ................ 8625125

[51] Int. Cl.⁴ ............................................. B32B 31/00
[52] U.S. Cl. ..................................... 428/34.5; 156/86; 264/342 R; 428/64; 428/68; 428/121; 428/192; 428/294; 428/902

[58] Field of Search ................... 428/36, 64, 121, 192, 428/222, 223, 902, 68, 294; 156/86, 84; 174/DIG. 8; 264/342 R Primary Examiner—James J. Bell
Attorney, Agent, or Firm—A. Stephen Zavell; Herbert G. Burkard

[57] ABSTRACT

A wrap-around recoverable article suitable for enclosing a splice in a telecommunications cable splice comprises a fabric cover portion and closure elements at its edge regions which can be held together to maintain the sleeve in a wrapped-around configuration around the cable splice. The closure elements comprise a bundle of heat-stable filaments, preferably glass, enclosed by a loop or folded-over portion of the fabric.

15 Claims, 2 Drawing Sheets

WRAP-AROUND RECOVERABLE ARTICLE

This invention relates to recoverable articles, and in particular to wrap-around heat recoverable articles.

It has been proposed, in UK Specification No. 8400191, to provide a heat recoverable wrap-around article formed from a heat recoverable fabric cover portion, edge regions of the fabric being provided with a mechanical closure for maintaining them in proximate relationship during recovery of the cover portion. The entire disclosure of UK Specification No. 8400191 is incorporated herein by reference. Such wrap-around articles have been found to be particularly suitable for enclosing splices between pressurised telecommunication cables and are now widely used for that purpose. A preferred method of manufacture of a useful commercial product is that illustrated in FIGS. 8a and 8b of UK Specification No. 8400191, in which closure elements are formed by folding over edges of the fabric around support rods. The edge of the fabric is folded over and secured in a clamp. The edge region is then heated to effect local recovery, thus shrinking the edge region into close engagement with the support rods. Other embodiments using support rods are also disclosed in the above mentioned UK specification.

In all these disclosed embodiments, the material of the support rods is either a metal, a solid plastics material, or a thermosetting adhesive. Hitherto, the most suitable support rod material has been found to be nylon, and this is the material which is used in practice because of its superior combination of physical properties, in particular its strength, flexibility and temperature resistance. However, solid nylon rod has been found to have disadvantages which make it difficult to use in continuous manufacture of wrap-around heat recoverable fabric articles. In particular, nylon rods shrink in length at the recovery temperature of the fabric, and it has therefore been found necessary to provide rods that are longer than the width of the fabric to allow for this shrinkage. This provision has rendered it difficult to devise a continuous manufacturing process in which the articles are cut to size after assembly from a long length of fabric.

We have now discovered a new support material which is strong, flexible, temperature resistant and is less prone to shrinkage when heated to the recovery temperature of the fabric. These and other advantages may be obtained, we have found, by replacing the support rod material with a bundle of heat stable filaments.

In one aspect, the present invention provides a recoverable wrap-around article which comprises (a) a recoverable fabric cover portion, and (b) at least one closure element provided on an edge region of the cover portion, the fabric having at least a component of recoverability perpendicular to the edge region, the closure element comprising a bundle of heat stable filaments enclosed by a loop or folded over portion of the recoverable fabric.

In another aspect the invention provides a method of forming a wraparound fabric article having a closure member at an edge region thereof, and having at least a component of recoverability perpendicular to the edge region, which comprises:

folding over an edge of a recoverable fabric to form a loop at the edge region;

securing the fold by holding together the resulting double thickness of fabric;

positioning a support comprising a bundle of heat stable filaments within the loop; and causing recovery of that part of the fabric which forms the loop.

The terms "wrap-around", "recoverable" and "heat recoverable" are described and explained in UK Specification No. 8400191 and have the same meaning herein. The preferred recoverable fabrics are also described and explained in UK Specification No. 8400191 and the preferred materials, physical characteristics and processes for manufacture of the recoverable fabric described therein apply equally to the present specification. The description of this specification will therefore be restricted to the closure for the recoverable wrap-around fabric article, and more particularly to a closure in which the recoverable fabric is folded over or looped around the bundle of filaments. It will be appreciated, however, that other closure mechanisms using support rods as described in UK Specification No. 8400191 may also be used in this invention, by replacing the support rod with a bundle of heat stable filaments.

The filaments may be made from any suitable heat stable material, that is to say, one that does not melt appreciably or shrink more than about 5%, preferably less than 1% at the recovery temperature. There may be used for example suitable metals, or suitable nonshrinking natural fibres or polymeric fibres, although these are not at present preferred. Preferably the filaments comprise glass fibres, and for example the bundle may comprise monofilament or multifilament glass fibres, or both. The glass filament bundle may range in weight from 5 to 12 grams/meter for example about 9 grams/meter. The bundle of filaments preferably has a diameter greater than 2 mm, and most preferably from 2.5 to 4.0 mm. It is not usually necessary for the glass filament bundle to have a diameter greater than 5 mm.

The bundle of glass filaments may simply be an untwisted single ply bundle of filaments of small diameter (from around 5 microns to 14 microns) or it may comprise several multifilaments, which may be twisted together. Suitable combinations of multifilaments range from $2\times34$ tex to $5\times136$ tex, preferably about $3\times68$ tex (grams/kilometer), with a number of twists ranging from 100–152 turns per meter. Preferably, however, the bundle is a single ply, either untwisted, or with a number of twists up to about 40 turns per meter.

Preferably, a retaining means is provided to prevent the bundle of filaments from unravelling during manufacture and use. This may or may not substantially change the physical properties, for example flexibility, of the filament bundle. Suitable retaining means may include, for example, a fibre or film wrapped around the bundle, a polymeric matrix within which the filament bundle may be embedded, or a polymeric sheath extruded around the filament bundle. Preferably the filament bundle is wrapped with one or more fibres helically wound around the bundle. The fibres may be polyethylene (which may be irradiated to improve its high temperature properties), polypropylene, nylon, or preferably a polyester. Preferably the fibre or fibres are wound so as to give substantially 100% coverage. Very good results have been obtained using fibres of from 20 to 50 tex, especially polyester fibres, and helically winding two such fibres in the opposite sense, one left and one right, to obtain the required coverage. Where the retaining means comprises a polymeric material, suitable polymers may include polyethylene, irradiated as required, a polyamide for example nylon, or a polyester.

Preferably, the filament bundle extends the full width of the recoverable wraparound article, although this may not be absolutely necessary in all cases. Also, although for some articles one closure element may be sufficient, it is usually necessary to provide two, arranged on opposed edge regions of the recoverable fabric. These closure elements can then be secured together, for example by means of a channel member, in order to hold them together against the recovery forces of the fabric.

The invention will now be illustrated by way of example with reference to the accompanying drawings in which.

Figure 1:
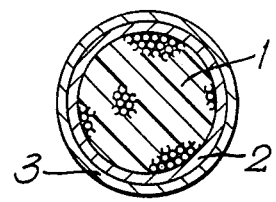
FIG. 1 shows a cross-section through a filament bundle for use in a wraparound article according to the invention.
Figure 2:
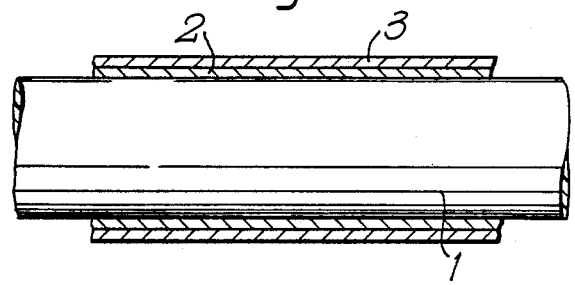
FIG. 2 shows the filament bundle of FIG. 1 in side elevation.

Referring now to FIGS. 1 and 2, an untwisted bundle of glass monofilaments 1, of weight 9.4 grams per meter, diameter 2.5 mm, and average individual monofilament diameter about 9 microns is wrapped with two helical layers of polyester fibre 2, 3 each of weight 28 grams per kilometer. The layers 2, 3 are wound in the opposite sense and give complete coverage of the filament bundle without substantially affecting its flexibility.

Figure 3:
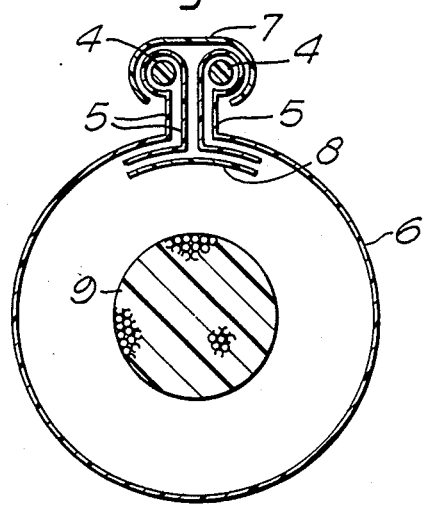
FIG. 3 shows an end elevation of a wraparound article according to the invention with the closure elements secured by a channel.

In FIG. 3 two of the filament bundles of FIGS. 1 and 2, indicated generally by 4, are accommodated by folding over edge regions 5 of a recoverable fabric 6. The bundles 4 and overlying fabric are held together by a closure channel 7. A flap 8 is provided underlying the abutting filament bundles 4, the purpose of which is to block any leak path. The flap 8 is provided as a separate member. It may instead be provided secured to part of fabric sleeve 6.

The fabric is shown around a cable 9, and when recovered the fabric will shrink down into engagement with the cable to provide an environmental seal. The fabric, preferably in combination with a composition that renders it impermeable to air, may be used to protect a variety of substrates such as cables, cable splices and pipes. Where a cable splice, or other irregularly shaped substrate is to be protected, a splice case may be constructed by providing a liner around the substrate and within the fabric sleeve. See for example UK Pat. No. 431167 and published patent applications No. 2059873 and 2069773. Such a liner in general has a central region of larger cross-section and end regions which taper down to the cables, thus providing a smooth transition from the large central splice bundle to the smaller cables. In such a situation, where the smaller cables. In such a situation, where the substrate is of non-uniform size, the fabric may have zones of different recovery ratios so that the unresolved recovery is, say, uniform over the entire substrate. This may be achieved by using different fabrics, or a single fibre type that has been differentially treated such as by subjecting it to different degrees of irradiation. Where such a splice case is intended to be able to retain a significant pressure, means are preferably provided at each junction between the fabric and the underlying cable to put the bond between them out of peel. Such means may, for example, present a concave surface to pressure within the splice case thereby overcoming the forces that would cause peel. A branch-out between two or more cables, particularly telecommunications cables, may be sealed with the recoverable fabric article of the invention, and means may be provided to hold together circumferentially spaced regions of the fabric between diverging cables. A suitable means for doing this is a two or three pronged clip which is positioned over an end of the fabric sleeve between the cables, see for example UK Pat. No. 1604981.

An alternative to a clip is to install around the cables a flexible seal which comprises an envelope which can undergo a change from lower to higher viscosity. The seal transforms the concave surfaces in the crutch region to a flat or convex surface to which the fabric article can seal. This seal is disclosed in copending UK patent application No. 8221597.

The problem of branch-off can, however, be overcome by producing the fabric sleeve in the correct shape to accommodate two or more branching substrates. This solution is particularly applicable to fabrics, and offers significant advantages. A fabric can be produced, especially by knitting, which has for example one outlet at one end and two at another end. Such an article may still be wrap-around since closure mechanisms can be provided for each outlet where the substrate to be accommodated has no accessible end. Where splices to drop wires are to be sealed the conduits for the main cable are preferably wrap-around, and the conduit for the drop wire tubular.

Figure 4:
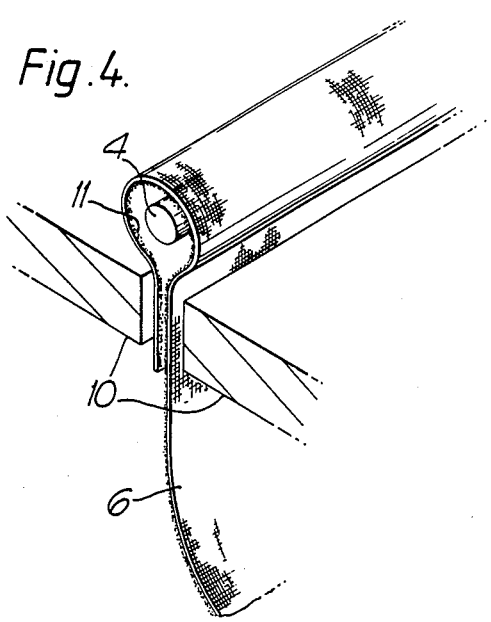
FIG. 4 shows a perspective view of a stage in the manufacture of a closure element for use in the present invention.
Figure 5:
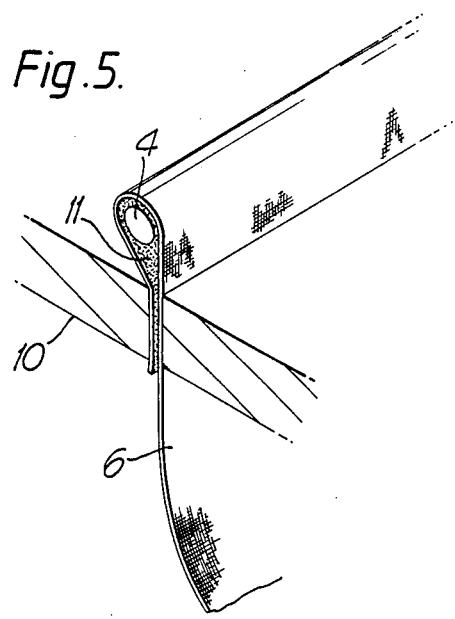
FIG. 5 shows the closure element of FIG. 4 after local heating.

FIGS. 4 and 5 show a method of forming a closure element at an edge region of a recoverable fabric. An edge of a recoverable fabric 6 is folded over around a filament bundle 4 and secured in that folded configuration in a vice or other clamp 10. A heat-activatable adhesive coating 11 is shown in addition to the filament bundle 4. The next step is recovery, preferably by heating the loop of recoverable fabric which extends above the vice 10 as drawn. The vice may conveniently act as a heat sink to limit recovery of the fabric to the loop. The loop shrinks and the adhesive is activated forming a tight and effectively solid closure rail at the edge of the sheet. Whilst insertion into the channel takes place. However on heating during recovery of the article the adhesive softens and the rail becomes flexible and thus able to follow the contour of the substrate upon which the article is recovered.

We claim:

1. A recoverable wrap-around article which comprises:
   (a) a recoverable fabric cover portion
   (b) at least one closure element provided on an edge region of the cover portion, the fabric having at least a component of recoverability perpendicular to the edge region, the closure element comprising a bundle of heat stable filaments enclosed by a loop or folded over portion of the recoverable fabric.

2. An article according to claim 1, in which the bundle of filaments comprises a bundle of glass fibres.

3. An article according to claim 1, in which a retaining means is provided to prevent the bundle of filaments from unravelling during manufacture and use.

4. An article according to claim 2 wherein a retaining means is provided to prevent the bundle of filaments from unravelling during manufacture and use.

5. An article according to claim 1 wherein the bundle of heat-stable filaments is selected from the group consisting of nonshrinking natural fibers, non-shrinking polymeric fibers, or mixtures thereof.

6. The article according to claim 1 wherein the bundle of heat-stable filaments is selected from the group consisting of polypropylene fibers, nylon fibers, polyester fibers, or mixtures thereof.

7. The article according to claim 2 wherein the glass fibers are selected from the group consisting of monofilament glass fibers, multi-filament glass fibers, or mixtures thereof.

8. The article according to claim 1 in which the bundle of filaments comprises a bundle of non-conductive heat-stable filaments.

9. An article according to claim 1 containing a second closure element provided on an edge region opposite to the edge region containing said at least one closure element.

10. A kit of parts capable of being assembled to form a recoverable wraparound article which comprises:
   (a) a recoverable fabric portion, said fabric portion having at least one closure element provided on an edge region of the cover portion, the fabric having at least a component of recoverability perpendicular to the edge region, the closure element comprising a bundle of heat-stable filaments enclosed by a loop or folded or portion of the recoverable fabric; and
   (b) means for maintaining the edge portion having said at least one closure element and an edge opposite thereto together during recovery.

11. The kit according to claim 10 further comprising a flap suitable for underlying the abutting closure elements.

12. The kit according to claim 11 wherein the recoverably fabric portion comprises at least two closure elements on opposing edge regions of said recoverable cover portion.

13. The kit according to claim 12 wherein the means for maintaining the edge portions together is a closure channel.

14. A method of forming a wrap-around fabric article having a closure member at an edge region thereof, and having at least a component of recoverability perpendicular to the edge region, which comprises:
   folding over an edge of a recoverable fabric to form a loop at the edge region;
   securing the fold by holding together the resulting double thickness of fabric;
   positioning a support comprising a bundle of heat stable filaments within the loop; and
   causing recovery of that part of the fabric which forms the loop.

15. A method of forming a wraparound fabric article having a closure member at an edge region thereof, and having at least a component of recoverably perpendicular to the edge region, which comprises:
   folding over an edge of a recoverable fabric to form a loop at the edge region around a bundle of heat-stable filaments within the loop so as to form a support, said bundle containing at least two or more heat-stable filaments;
   securing the fold by holding together the resulting double thickness of fabric around the bundle of heat-stable filaments; and
   causing recovery of that part of the fabric which forms the loop.

* * * * *

UNITED STATES PATENT AND TRADEMARK OFFICE
CERTIFICATE OF CORRECTION

PATENT NO. : 4,824,706

DATED : April 25, 1989

INVENTOR(S) : Overbergh et al.

It is certified that error appears in the above-indentified patent and that said Letters Patent is hereby corrected as shown below:

Cover Page, before "Primary Examiner" insert as a new section
--[56] References Cited U.S. Patent Documents 4,219,051 08/1980 D'Haeyer
Foreign Patent Documents 2,134,334 Great Britain,0,035,737 European, 1,266,710 Great Britain, 117,762 European, 2,019,123 Great Britain--.

Column 3, line 54 replace "431167" by--1431167--.

Column 3, lines 59 to 60 delete "in such a situation, where the smaller cables."

Column 4, line 46 replace "sheet, Whilst" by--sheet whilst--

UNITED STATES PATENT AND TRADEMARK OFFICE
CERTIFICATE OF CORRECTION

PATENT NO.  : 4,824,706
DATED       : April 25, 1989
INVENTOR(S) : Overbergh et al.

It is certified that error appears in the above-indentified patent and that said Letters Patent is hereby corrected as shown below:

Claim 10, line 9 (Column 5, line 32) replace "foled or portion by--folded-over portion--.

Claim 12, lines 1 to 2 (Column 6, lines 4 to 5) replace "recoverabley" by --recoverable--.

Claim 15, line 3 (Column 6, line 25) replace "recoveably" by--recoverability--.

Signed and Sealed this

Seventeenth Day of January, 1995

Attest:

BRUCE LEHMAN

Attesting Officer

Commissioner of Patents and Trademarks